(12) United States Patent
Winn (10) Patent No.: US 7,834,510 B2
(45) Date of Patent: Nov. 16, 2010

(54) TORQUE SUPPORT MEMBER FOR ROTATING ELECTRICAL MACHINE

(75) Inventor: Peter M. Winn, Shrewsbury, MA (US)

(73) Assignee: American Superconductor Corporation, Devens, MA (US)

( * ) Notice: Subject to any disclaimer, the term of this patent is extended or adjusted under 35 U.S.C. 154(b) by 0 days.

(21) Appl. No.: 12/575,762

(22) Filed: Oct. 8, 2009

(65) Prior Publication Data

US 2010/0133943 A1    Jun. 3, 2010

(51) Int. Cl.
*H02K 1/22* (2006.01)
(52) U.S. Cl. ..................... 310/261.1; 310/52
(58) Field of Classification Search .......... 310/261.1, 310/52, 61, 64, 216.116, 216.127
See application file for complete search history.

(56) References Cited

U.S. PATENT DOCUMENTS 4,058,746 A * 11/1977 Mole et al. ............. 310/10
5,880,547 A * 3/1999 Shoykhet ............... 310/91
6,489,701 B1  12/2002 Gamble et al.
6,509,819 B2   1/2003 Snitchler et al.
6,700,274 B2 * 3/2004 Gamble et al. ......... 310/179
7,119,644 B2  10/2006 Snitchler et al.

* cited by examiner

*Primary Examiner*—Dang D Le
(74) *Attorney, Agent, or Firm*—Occhiuti Rohlicek & Tsao LLP

(57) ABSTRACT

A support module is provided for use in a rotor assembly of a rotating machine. The support module is disposed on the rotor body, supports high temperature superconductor rotor windings within the rotor assembly, and thermally decouples the cold portions of the rotor assembly, including windings and support tube, from the ambient temperature rotor body and drive shaft. The support module includes a frame disposed on the rotor body, a support block connected to the rotor winding and suspended within the frame, and thermally non-conductive straps extending from each of a pair of opposed sides of the support block to the frame, the straps suspending the support block within the frame.

19 Claims, 10 Drawing Sheets

TORQUE SUPPORT MEMBER FOR ROTATING ELECTRICAL MACHINE

GOVERNMENT RIGHTS STATEMENT

The U.S. Government has a paid-up license in this invention and the right in limited circumstances to require the patent owner to license others on reasonable terms as provided for by the terms of Contract No. 70 NANB7H7055 awarded by the National Institute of Standards and Technology/Advanced Technology Program.

BACKGROUND OF THE INVENTION

Superconducting generators have been under development since the early 1960s. The use of superconducting windings in these machines has resulted in a significant increase in the magnetomotive forces generated by the windings and increased flux densities in the machines. However, superconducting windings require cryogenic temperatures to operate properly. Thus, higher torque motors and generators are being developed to include mechanisms for transferring torque between a rotor winding assembly and an output shaft while limiting heat transported to the cryogenic region of the machine.

SUMMARY

In one aspect, a support device for use in a rotor assembly of a rotating machine is provided. The rotor assembly includes a rotor winding and a rotor body. The support device includes a frame configured to be disposed on the rotor body, a support block configured to be connected to the rotor winding and suspended within the frame, and straps extending from each of a pair of opposed sides of the support block to the frame. The straps suspend the support block within the frame, and the support device provides a connection between, and fixes relative positions of, the rotor winding and rotor body.

The support device may include one or more of the following features: The frame further includes walls and a closed end, and the support block is suspended within the frame so as to be surrounded by the walls, and spaced apart from the walls and the closed end. An inner surface of the frame walls are configured to connect to one of the straps. The straps are provided with a predetermined tension load. The straps comprise a substantially thermally non-conductive material. The support block includes a first surface configured to connect to a rotor winding, a second surface opposed to the first surface, the opposed sides extending between the first and second surfaces, and each of the opposed sides are configured to connect to one of the straps. The support block is suspended such that the second surface of the support block is spaced apart from the closed end of the frame. The support block is suspended such that the first surface resides outside the frame. At least one of the straps is configured to support loads applied both in an axial direction of the rotor assembly and in a direction transverse the axial direction. The straps are oriented at an angle relative to both the axial direction of the rotor assembly and in the direction transverse the axial direction. The frame includes walls that support tensioning pins, and the tensioning pins are configured to apply a tension load to the straps. The tensioning pins permit adjustment of the amount of tension applied to the straps. The tensioning pins are configured so that the tension applied to each strap is individually adjustable. The support device substantially thermally decouples the rotor winding from the rotor body.

In another aspect, a rotor assembly of an electric rotating machine is provided. The rotor assembly includes a rotor shaft coincident with a longitudinal axis of the rotor assembly, a cylindrical rotor body coaxial with and fixed to the rotor shaft, a winding assembly including a superconducting rotor winding wound around an axis transverse to the longitudinal axis, the rotor winding extending in a longitudinal direction and being radially spaced apart from the rotor body, and a support device disposed between the rotor winding and the rotor body. The support device includes a frame configured to be disposed on the rotor body, a support block configured to be connected to the rotor winding and suspended within the frame, and straps extending from each of a pair of opposed sides of the support block to the frame. The straps suspend the support block within the frame.

The rotor assembly may include one or more of the following features: The frame further includes walls and a closed end, and the support block is suspended within the frame so as to be surrounded by the walls, and spaced apart from the walls and the closed end. The support device substantially thermally decouples the rotor winding assembly from the rotor body. The rotor body is ferromagnetic. The winding assembly is disposed radially outward relative to the rotor body, and the support device resides in a space between the rotor body and the winding assembly. The support device is a generally flat rectangular member such that the overall radial dimension of the support device is less than an overall dimension transverse to the overall radial dimension.

In still another aspect, a method of assembling a rotor assembly is provided. The rotor assembly includes a rotor winding and a rotor body. The method includes providing a support device, the support device including a frame fixed to the rotor body, a support block fixed to the rotor winding and suspended within the frame, and elongate straps extending from each of a pair of opposed sides of the support block to the frame so as to suspend the support block within the frame. The method includes applying a predetermined pre-tension load to the straps, disposing the frame on the radially outward surface of the rotor body, and connecting the support block to a radially inward surface of the rotor winding.

The support member secures the rotor winding assembly in a desired position relative to the rotor body. In addition the support member provides torque transfer between the rotor winding assembly and the rotor body, and also thermally isolates the rotor winding assembly from the rotor body.

The support member has a very low profile so that it can be disposed in the vacuum gap between rotor winding assembly and the rotor body, which in some embodiments may be as narrow as ¾ inch.

The support member is modular in construction and can be pre-assembled separately from, and externally of, the rotor assembly, and then easily attached to the rotor body at the time of machine assembly. Pre-assembly permits support straps within the support member to be pre-tensioned and tested before connection to the rotor body, improving machine reliability.

The disclosed generator employs an iron rotor body, which is advantageous since the magnetic flux generated by the iron rotor body means that less superconductor material is required to achieve the same power output. In effect, this lowers the overall cost of the generator since the cost and/or complexity of the superconducting windings are also reduced. However, the structure of the iron rotor body is such that very little space is permitted for support of the rotor winding assembly. Here, the low profile of the support member is advantageous since it provides adequate rotor winding assembly support while permitting use of the iron core within the generator.

DETAILED DESCRIPTION

Figure 1:
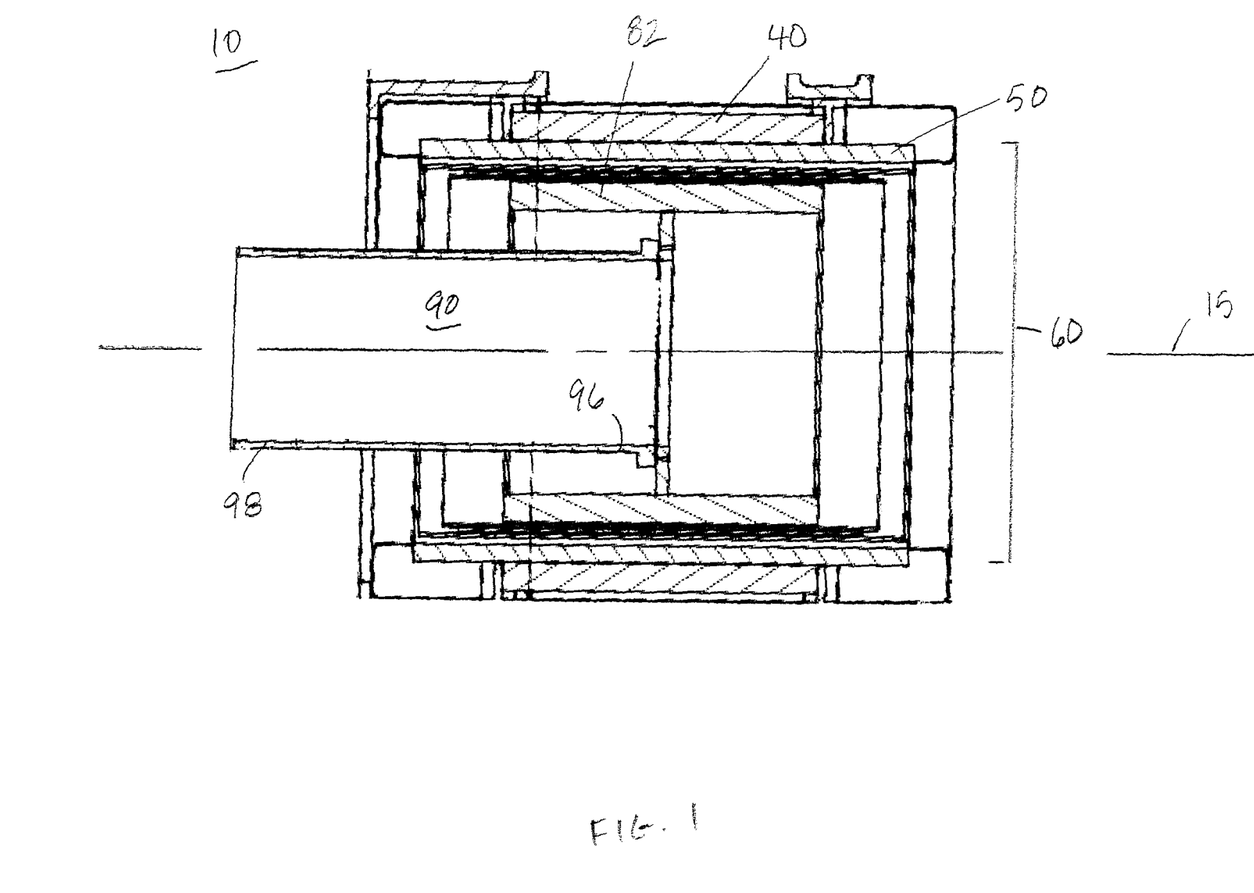
FIG. 1 is a schematic side sectional view of a generator.

Referring now to FIG. 1, generator 10 is a rotating superconducting machine that includes a rotor assembly 60 and a stator assembly 40. As will be described in greater detail below, the rotor assembly 60 is supported within the stator assembly 40 so that the rotor and stator assemblies are coaxial with each other and a longitudinal axis 15 of the generator 10.

Figure 2:
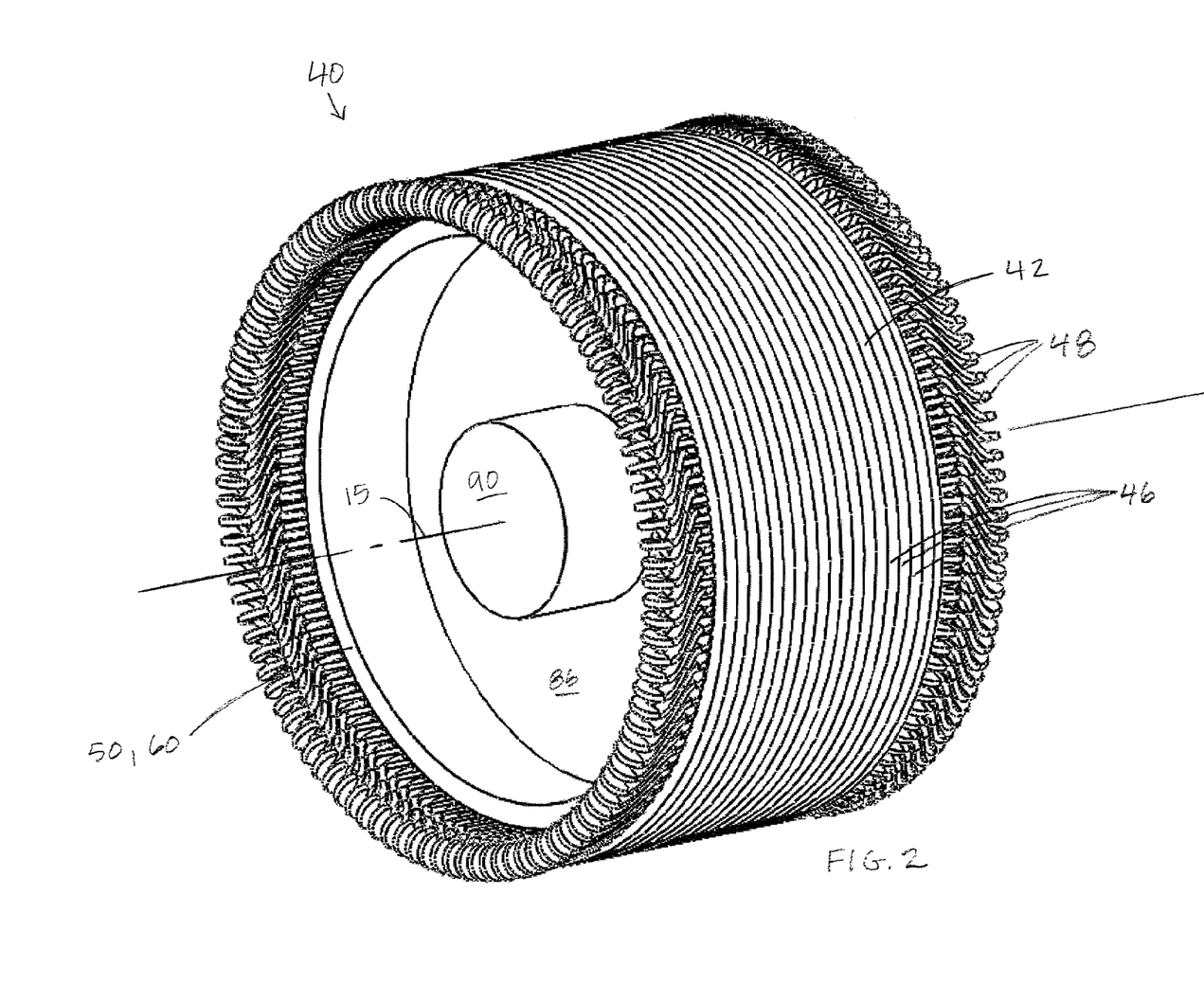
FIG. 2 is a perspective view of the stator assembly of the generator of FIG. 1.

Referring to FIG. 2, the stator assembly 40 includes a stator core 42 and stator windings 48 supported within the stator core 42. The stator core 42 is a hollow cylindrical body that is an assembly of laminated annular ferromagnetic plates 46. The stator windings are formed of transposed wire cables (not shown), in which the individual copper wire conductors (not shown) are twisted and/or woven to form a pattern which reduces conduction losses. The transposed cables may include Litz wire, Rutherford wire, Robel wire, or any other suitable transposed wire. The transposed cables are wound around an axis transverse to the longitudinal axis 15 of the generator 10 to form an elongated multi-turn stator winding 48 having a conventional shape such as diamond or cranked, and the stator windings 48 are cooled by conventional means.

Figure 3:
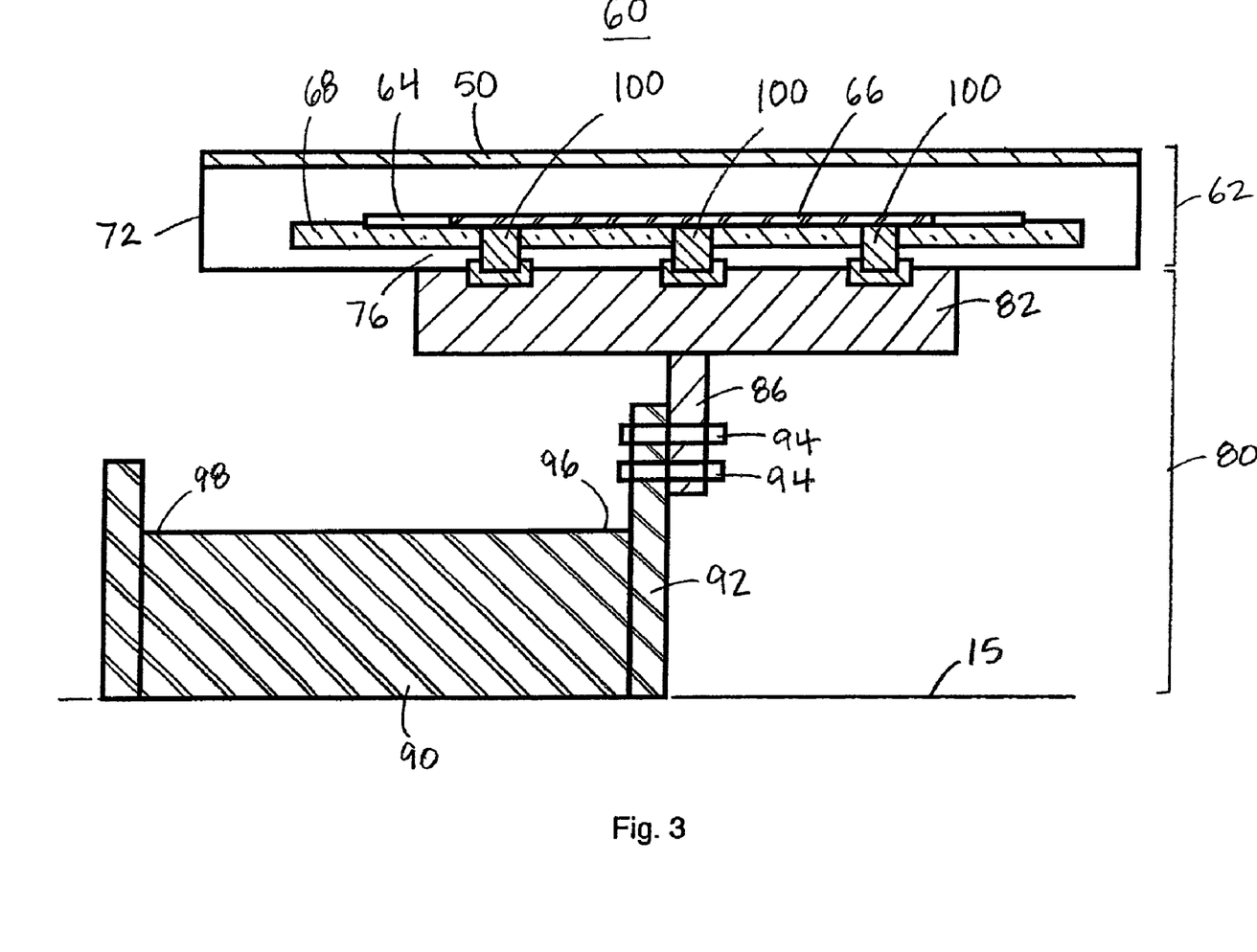
FIG. 3 is a schematic side sectional view of the rotor assembly of the generator of FIG. 1.

Referring to FIG. 3, the rotor assembly 60 includes a rotor winding assembly 62 and a torque transfer assembly 80 which are surrounded by an electromagnetic shield 50. The electromagnetic shield 50 consists of a conductive, non-magnetic material that shields rotor windings 64 within the rotor winding assembly 62 by attenuating asynchronous fields produced by the stator currents. In addition, the electromagnetic shield 50 shields the rotor winding assembly 62 from heat generated in the stator assembly 40.

The rotor winding assembly 62 includes rotor windings 64 formed of a high-temperature superconductor (HTS) wound around a mandrel 66. Although other configurations are possible, the rotor windings 42 of this embodiment include several HTS sub-coils formed in a racetrack configuration. U.S. Pat. No. 6,509,819, the entire contents of which are incorporated herein by reference, discusses exemplary rotor coil configurations in more detail. The rotor windings 64 and mandrel 66 are disposed on a cylindrical rotor winding support tube 68, and the rotor windings 64, mandrel 66 and rotor winding support tube 68 are all enclosed within a cryostat 72.

The rotor windings 64 are conduction cooled through the rotor support tube 68. In some embodiments, cooling tubes (not shown) are welded to the outer surface of the rotor support tube 68 intermediate the rotor windings 64. In other embodiments, the cooling tubes may be disposed on the mandrel 66 and/or windings 64 themselves. Alternatively, other methods for cooling the rotor windings 4 may be substituted for the cooling tube arrangement. For example, in some embodiments, gaseous helium is circulated inside the cryostat 72 to cool the rotor windings 64. The coolant supply lines (not shown) that permit inward and outward flow of the gaseous helium to the rotor winding assembly 62 pass through a coaxial helium transfer coupling (not shown), which is a stationary-to-rotating union.

The torque transfer assembly 80 is disposed radially inward relative to the rotor winding assembly 62, and rotatably and coaxially supports the rotor assembly 60 within the stator assembly 40. In addition, the torque transfer assembly 80 supports the rotor winding assembly 62 and transfers the rotational forces generated by the rotor winding assembly 62 to a drive shaft 90.

The torque transfer assembly 80 includes one or more support modules 100 connected to the rotor winding assembly 62, a rotor body 82 which supports and positions the support modules relative to the rotor winding assembly 62, and the drive shaft 90. The drive shaft 90 is fixed at one end 96 to the rotor body 82, and is supported by bearings (not shown) at the other end 98. The rotor body 82 and drive shaft 90 reside outside the cold space defined by the cryostat 72, and thus operate at ambient temperature.

Figure 4:
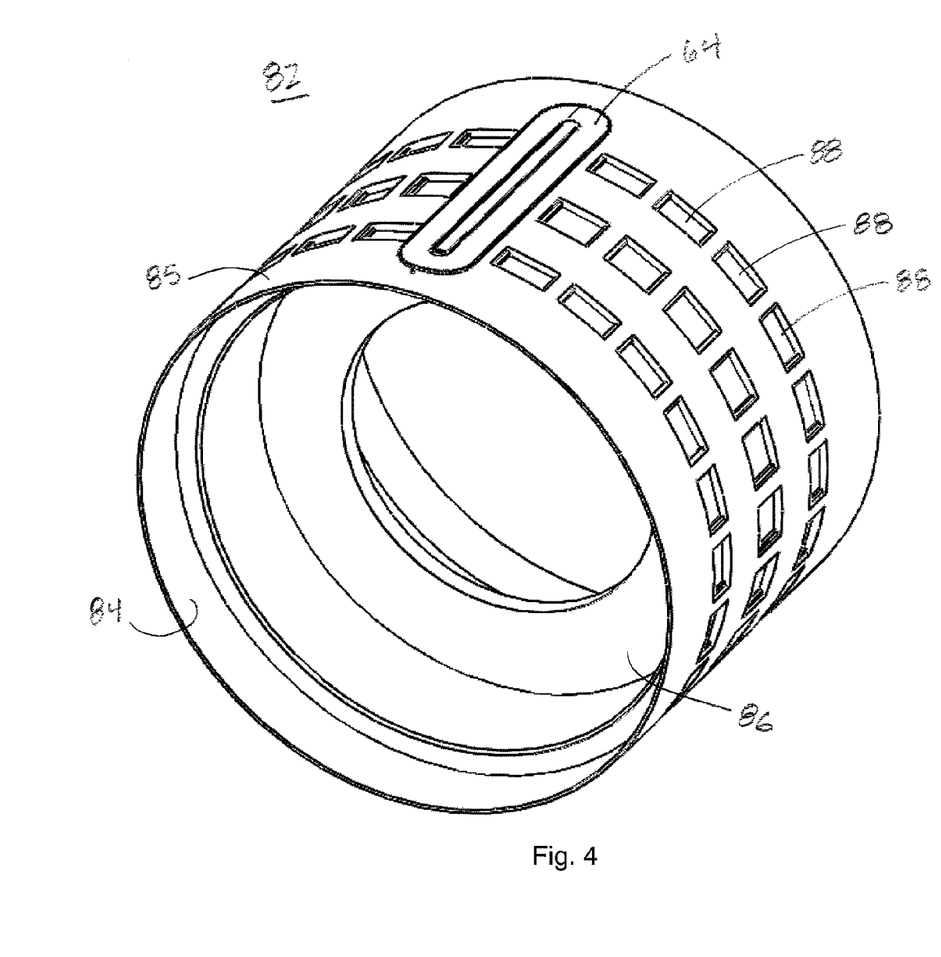
FIG. 4 is a perspective view of the rotor body.

Referring to FIG. 4, the rotor body 82 is a hollow cylindrical member that rigidly supports the support modules 100 relative to the rotor winding assembly 62, and transfers torque from the support modules 100 to the drive shaft 90. In addition, the rotor body 82 is formed of a ferromagnetic material, and thus provides a lower reluctance path for the magnetic field generated by the HTS windings 64, thereby increasing the amount of magnetic flux through the flux path linking the stator assembly 40. The rotor body 82 includes an outer surface 85 that confronts an inner surface of the cryostat 72, and an inner surface 84 that is opposed to the outer surface 85. The inner surface 84 of the rotor body 82 includes a flange 86 that protrudes radially inward. The flange 86 is disposed approximately at an axial midline of the rotor body 82, and provides a rigid connection between the rotor body 82 and the drive shaft 90. For example, the flange 86 may be connected to an end flange 92 of the drive shaft 90 using bolts (not shown).

The outer surface 85 of the rotor body 82 is provided with multiple cut-outs 88 which are each sized and shaped to receive individual support modules 100 therein. In the illustrated embodiment, the cutouts 88 are rectangular in shape and are relatively shallow, to reflect the corresponding shape of the support modules 100, as discussed further below. By cutting the outer surface 85 at discrete locations, the beneficial electromotive effect of the ferromagnetic rotor body 82 is not compromised.

Figure 5:
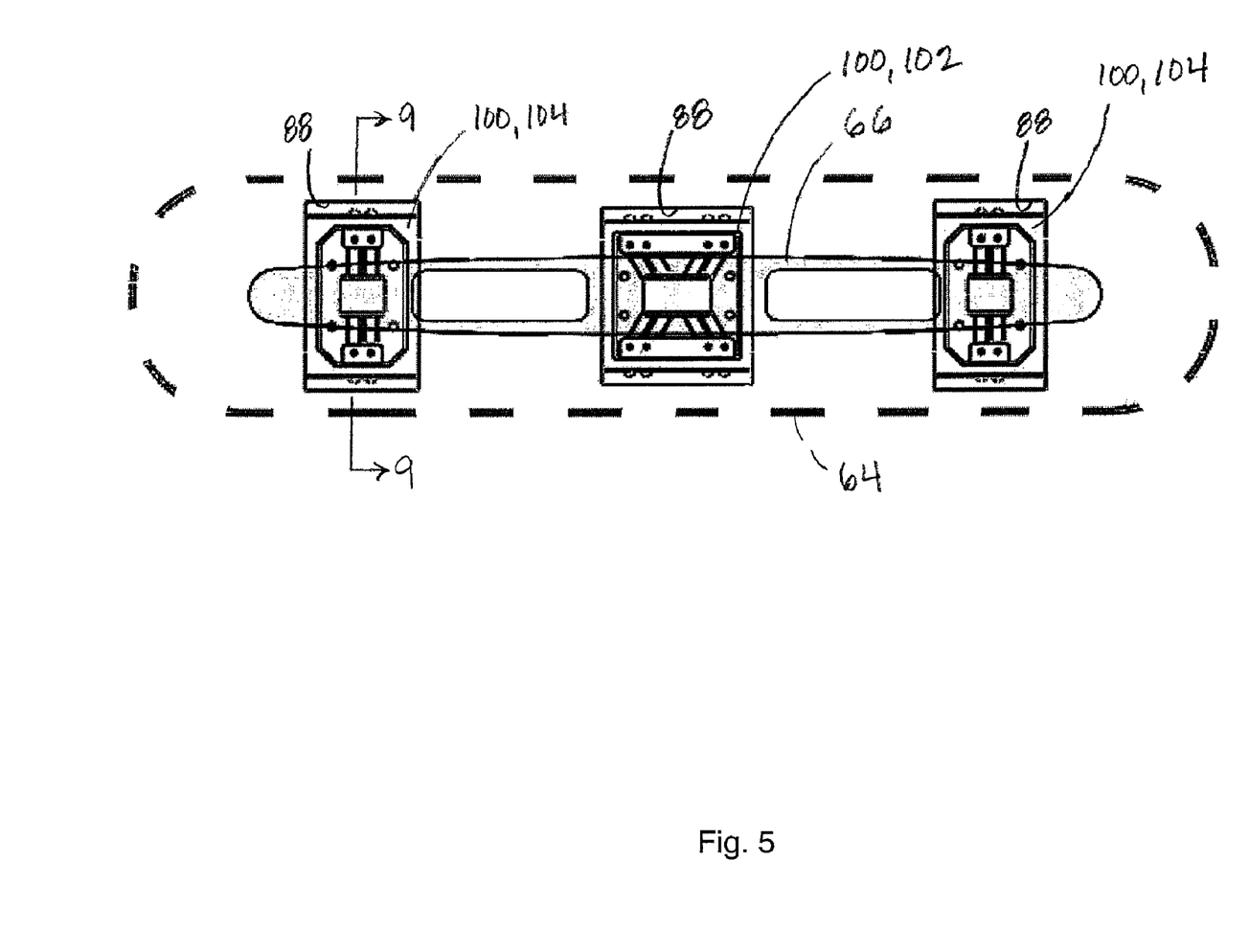
FIG. 5 is a plan view of a portion of the rotor body showing three support modules supporting the mandrel of an HTS rotor winding.

As shown in FIG. 5, support modules 100 are used to support the rotor winding assembly 62 by providing a connection between, and fixing the relative positions of, the rotor winding assembly 62 and the rotor body 82. In the illustrated embodiment, a center support module 102 is used to secure the center of a mandrel 66 to the rotor body 82, and an end support module 104 is used to secure each respective end of the mandrel 66 to the rotor body 82, one end support module 104 being disposed on each side of the center support module 102. The center support module 102 and end support modules 104 are aligned and mutually spaced apart along a line that is parallel to the longitudinal axis 15. Although three support modules 104, 102, 104 are used in this embodiment, fewer or greater numbers of support modules may be used. At least two support modules are required, and additional support modules may be used depending on design factors such as, but not limited to, machine size, amount of generated torque or number of poles.

An end support module 104 will be described in detail with reference to FIGS. 6-8. In the following description, references to relative directions or positions such as upper, lower, upward, downward, above, and/or below are made for purposes of explanation with reference to the figures, and are not intended to be absolute or limiting.

Figure 6:
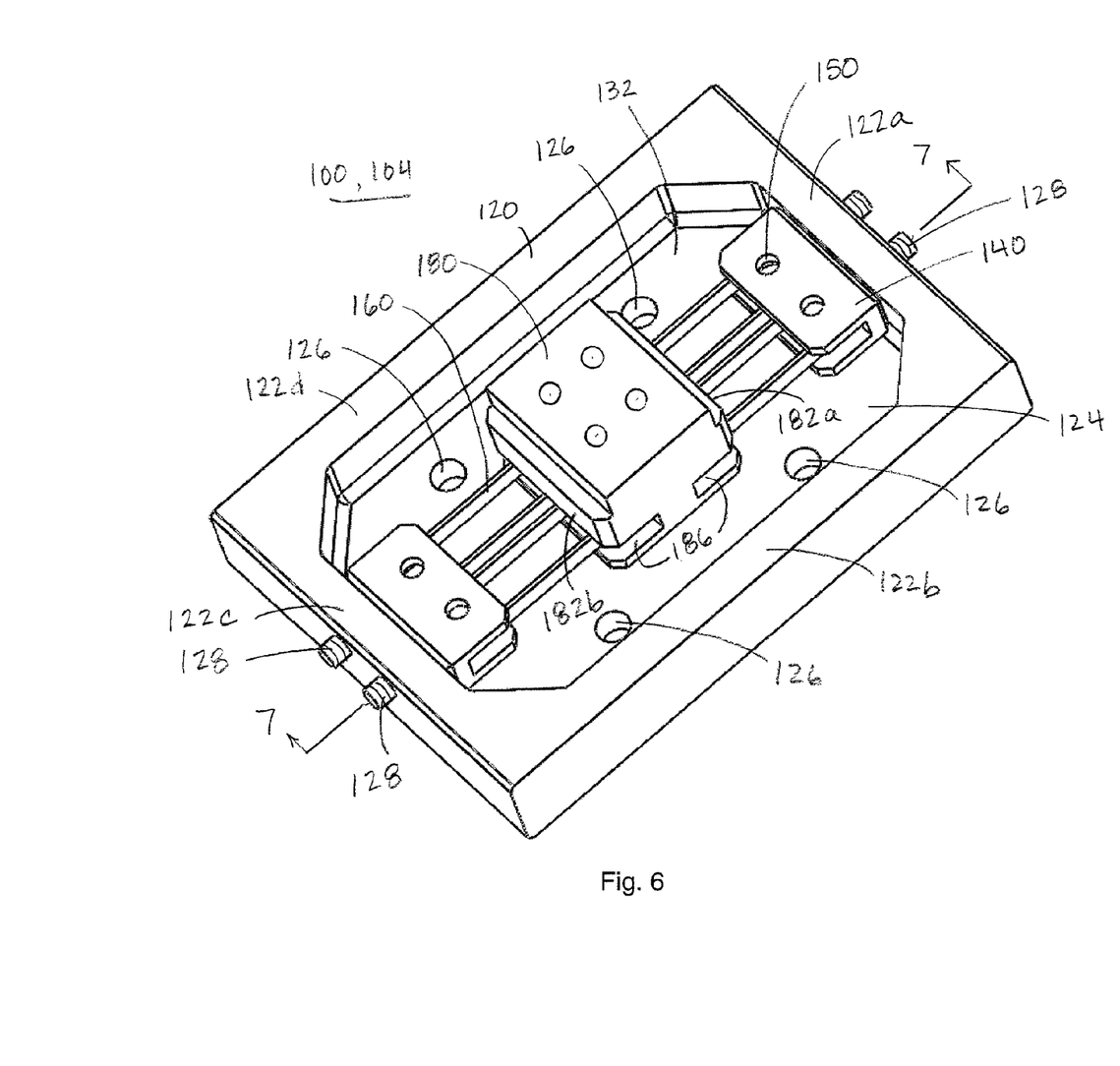
FIG. 6 is a top perspective view of an end support module.

Referring now to FIG. 6, the end support module 104 includes a frame 120, a support block 180 suspended within the frame, and straps 160 that extend from the support block 180 to the frame 120.

In the illustrated embodiment, the frame 120 is formed of a ferromagnetic material, for example steel. The frame 120 is a generally rectangular structure that includes four walls 122a, 122b, 122c, 122d arranged to provide a closed section. The walls 122a-d extend upward from a closed lower end 124, and the lower end 124 includes through holes 126 to permit the frame 120 to be fastened to the rotor body 82.

The frame 120 is a low profile structure in which the height of the frame 120 is small relative to the length and width of the frame 120. In the illustrated embodiment, the frame 120 has a length of about 12 inches, a width of about 8 inches and a height of about 1 inch. These dimensions are provided to illustrate relative scale and proportion, and the frame 120 is not limited to this size. Actual dimensions are understood to be determined by the requirements of a specific application. By providing frame 120 as a low profile structure, it is possible to provide the support module 100 in the relatively narrow vacuum gap 76 between the rotor winding assembly 62 and the torque transfer assembly 80. In the illustrated embodiment, the vacuum gap 76 is about ¾ inch in a generator 10 having an overall diameter of approximately 196 inches.

Figure 7:
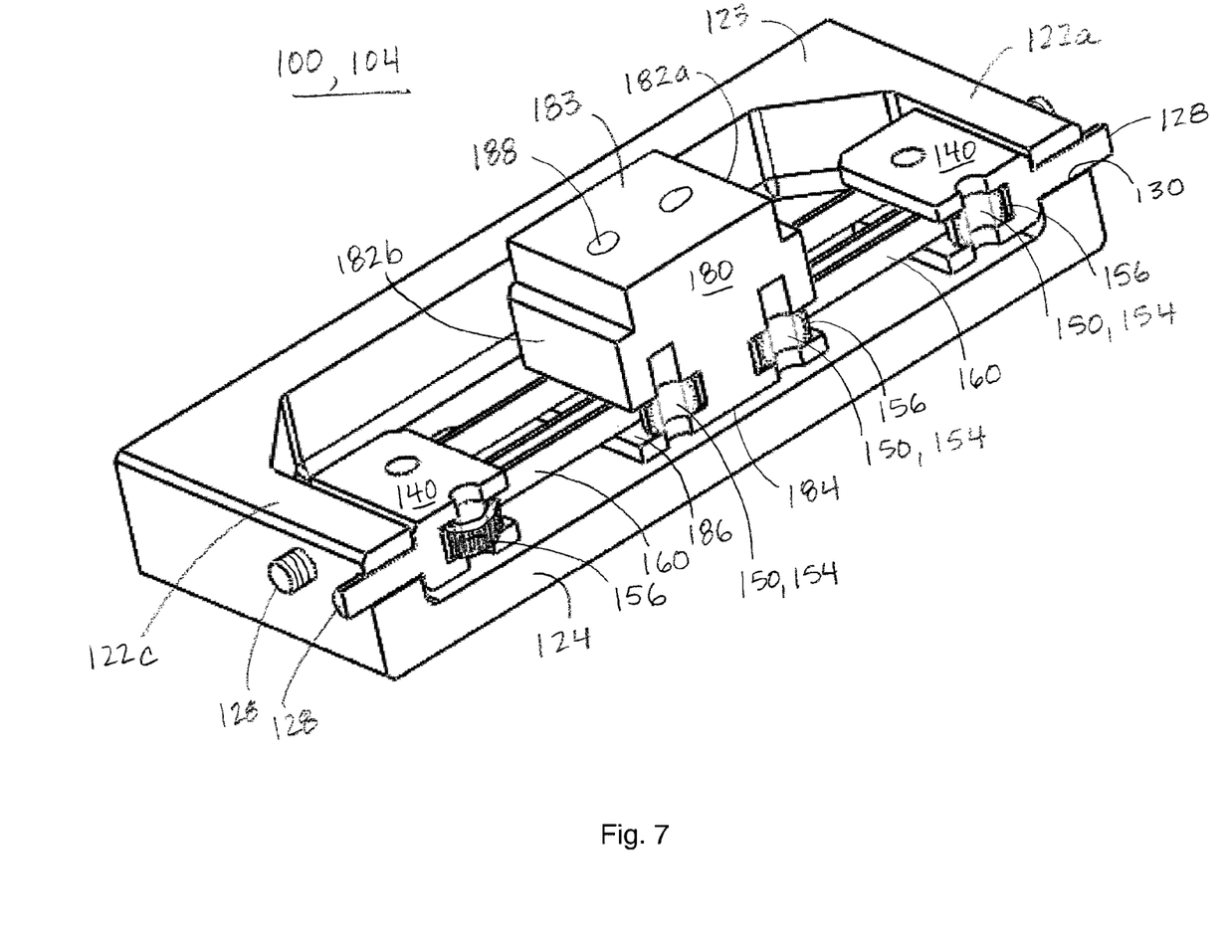
FIG. 7 is a sectional view of the end support module as seen along line 7-7 of FIG. 6.
Figure 8:
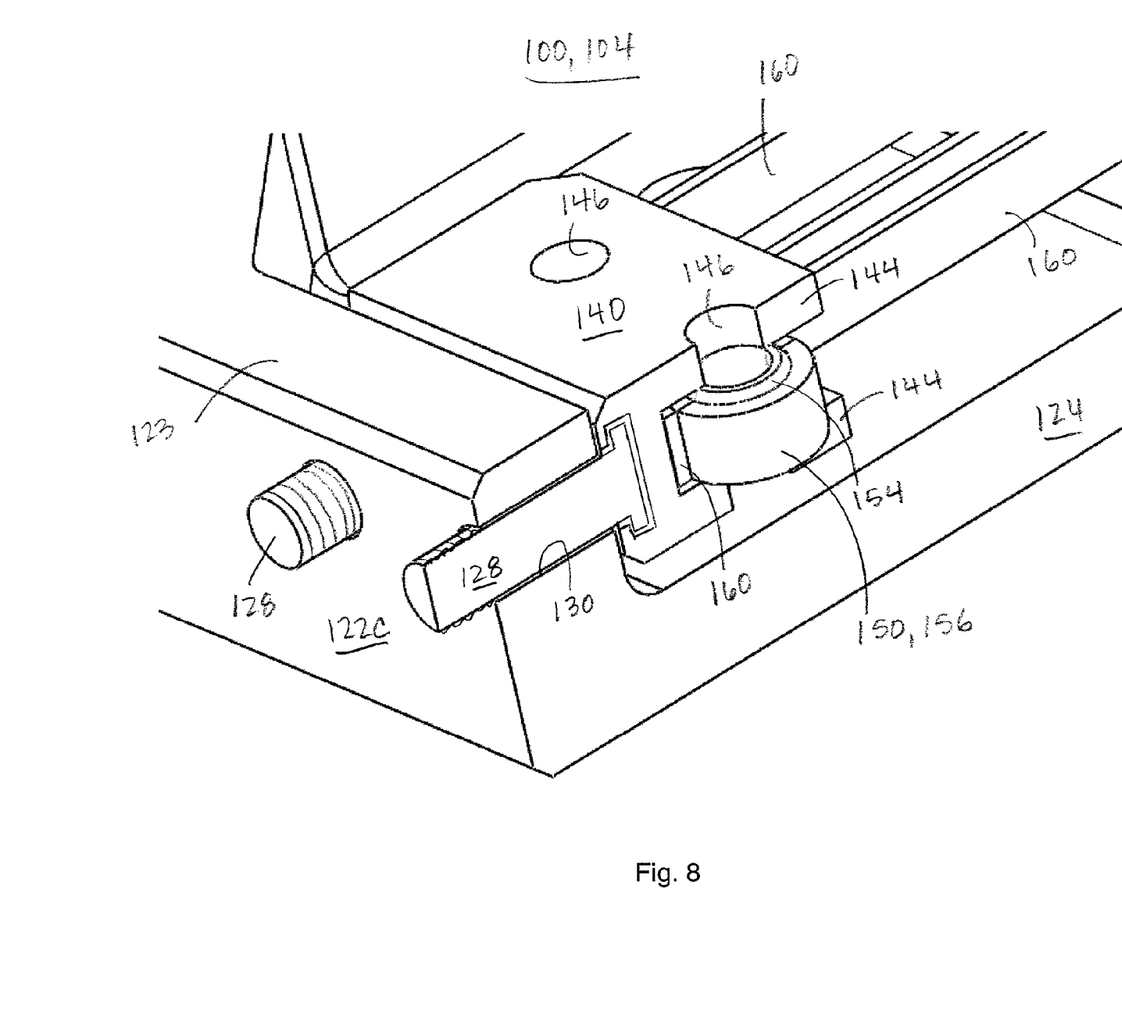
FIG. 8 is an enlarged view of a portion of the frame and strap block of FIG. 7.

Referring also to FIGS. 7 and 8, a pair of opposed walls 122a, 122c of the frame 120 include threaded bolt holes 130. The bolt holes 130 are through holes that open within the interior space 132 defined by the walls 122a-d and the lower end 124 of the frame 120. The bolt holes 130 are threaded and dimensioned receive and engage tensioning bolts 128, which are described below.

The support block 180 is disposed within interior space 132 of the frame 120, and includes a first surface 183 configured to connect to the rotor winding assembly 62. Specifically, the first surface 183 includes several bolt holes 188, and the mandrel 66 of the rotor winding 64 is fixed to the first surface 183 using bolts 190 received within the bolt holes 188. The support block 180 further includes a second surface 184 opposed to the first surface, which faces and is spaced apart from the closed end 124 of the frame. The side surfaces 182a, 182b on opposed sides of the support block 180 join the first and second surfaces 183, 184. The side surfaces 182a, 182b include channels 186 formed adjacent to the second surface 184 and extending in parallel thereto. The support block 180 is suspended within the frame 120 using the straps 160, which are connected to the support block 180 via ball joints 150 disposed in the channels 186, as discussed further below. In particular, the straps 160 extend between an inner surface of the frame walls 122a, 122c and the sides 182a, 182b of the support block 180.

Figure 9:
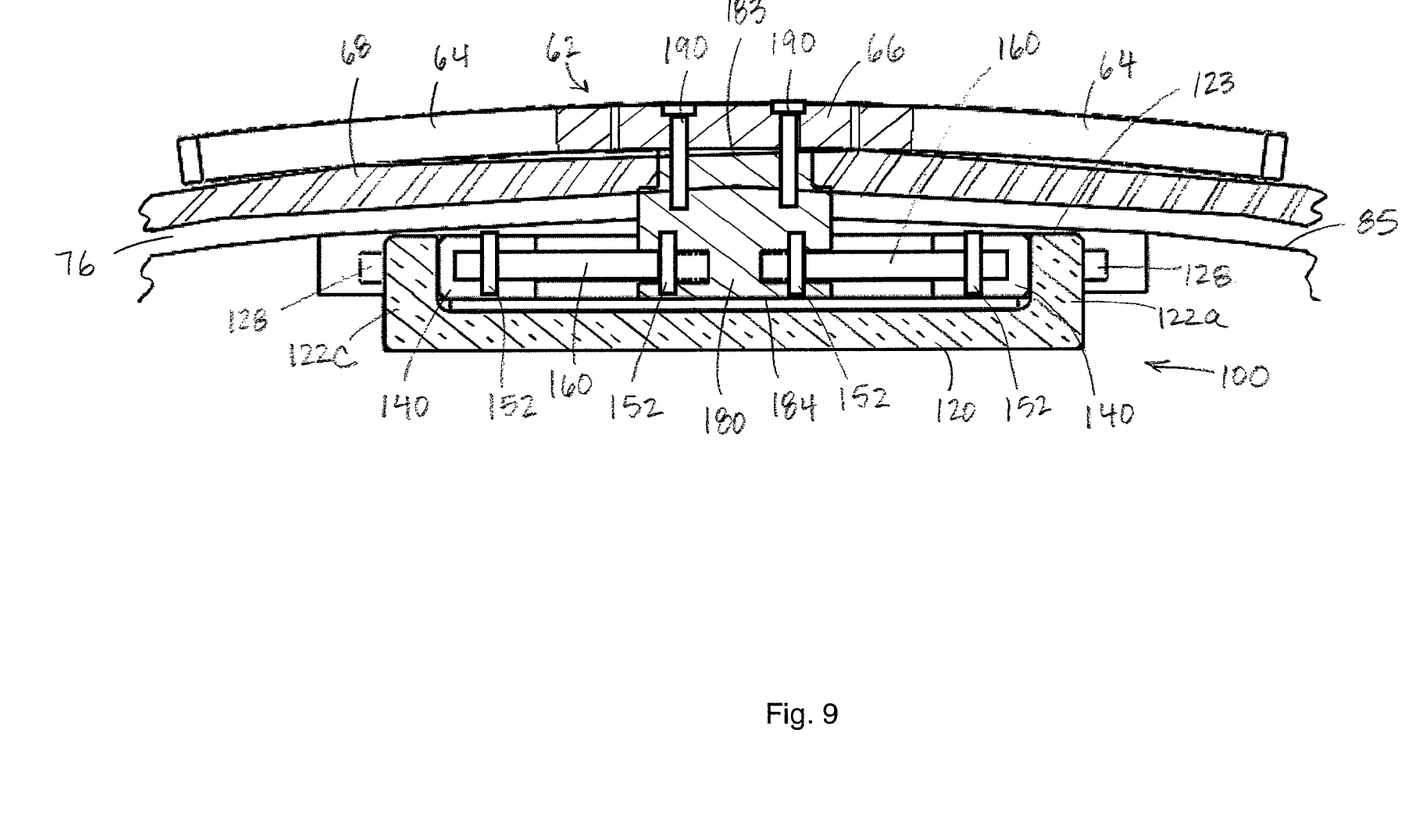
FIG. 9 is a sectional view of a portion of the rotor body including a support module as seen along line 9-9 of FIG. 5.

Referring also to FIG. 9, the support block 180 is suspended within the frame 120 so that the support block 180 is surrounded by the walls 122a-d of the frame 120, the support block 180 is spaced apart from both the walls 122 a-d and the closed lower end 124 of the frame 120, and the first surface 183 resides outside the frame. In particular, the support block 180 is of sufficient height to extend across the vacuum gap 76 and through an opening 69 formed in the winding support tube 68, and so that the first surface 183 abuts the mandrel 66.

Referring to again to FIGS. 7 and 8, the ball joints 150 include a post 152 including a spherical portion 154 formed in the midsection thereof. The ball joints 150 further including a cylindrical housing 156 having an inner surface which conforms to the shape of the spherical portion 154, and rotates relative thereto about the longitudinal axis of the post 152. The outer surface of the cylindrical housing 156 provides a contact surface for the straps 160. Use of ball joints 150 to connect the straps 160 assures that a pure tension load is provided to the respective structures, and also permits accommodation of thermal contractions.

Adjacent to the walls 122a, 122c of the frame 120, the posts 152 of each respective ball joint 150 are supported by a strap block 140. The strap block 140 is a U-shaped channel member that opens facing the support block 180. Opposed ends of the ball joint posts 152 are supported in corresponding aligned post holes 146 formed in leg portions 144 of the strap block 140, and the cylindrical housing 156, which rotatably surrounds the spherical portion 154, is received within the space between the legs 144 of the strap block 140.

The strap block 140 extends along interior surface of the respective wall 122a, 122c, and tension bolts 128 are used to adjustably connect the base portion 142 of the strap block 140 to a respective wall 122a, 122c. In the illustrated embodiment, each wall 122a, 122c includes two tension bolts 128, each connected to the base portion of the corresponding strap block 140 in the vicinity of a ball joint 150. For certain applications, additional tension bolts 128 may be included if required to accommodate high loads on straps 160. By turning the tension bolts 128 within the bolt holes 130, the spacing between the strap block 140 and the respective wall 122 can be adjusted. Since the straps 160 are connected to the strap block 140 through the ball joints 150, the tension of the straps 160 can be adjusted by adjusting the position of the tension bolts 128 in the bolt holes 130. In the illustrated embodiment, the tension bolts 128 act through the strap block 140, whereby the tension in all corresponding straps 170 is adjusted as a group. In other embodiments, the bolts 128 may be configured so that the tension applied to each strap 160 is individually adjustable.

Straps 160 are formed in a loop which encircles both a ball joint 150 of the strap block 140 and a ball joint 150 of the support block 180. The straps 160 are formed of a thermally non-conductive material. In addition, the strap material is selected so that the straps 160 are sufficiently stiff to maintain the position of the rotor winding assembly 60 relative to the rotor body 82, and sufficiently flexible to accommodate temperature-induced contraction of the cold rotor winding assembly relative to the warm rotor body 82. In the illustrated embodiment, for example, the straps 160 are closed loops formed of wound glass fibers such as para-aramid fibers bound in epoxy. Use of the thermally-isolating straps 160 permits the cold mass of the rotor winding assembly 62, particularly the rotor winding 64, to be thermally isolated from the warm mass of the torque transfer assembly 80, particularly from the rotor body 82.

The straps 160 are provided with a tension preload, which ensures that the straps remain in tension during a fault load of the generator 10. By using ball joints 150 to anchor the straps 160 to the support block 180 and to the strap blocks 140, a pure tension load on the straps 160 can be achieved, and the thermal contractions of the cold mass (rotor assembly 60) can be accommodated. In the illustrated embodiment, the tension preload is about 3000 lb. However, the straps 160 are not limited to being used at this tension preload, and the tension preload in use is determined by the requirements of a specific application.

Figure 10:
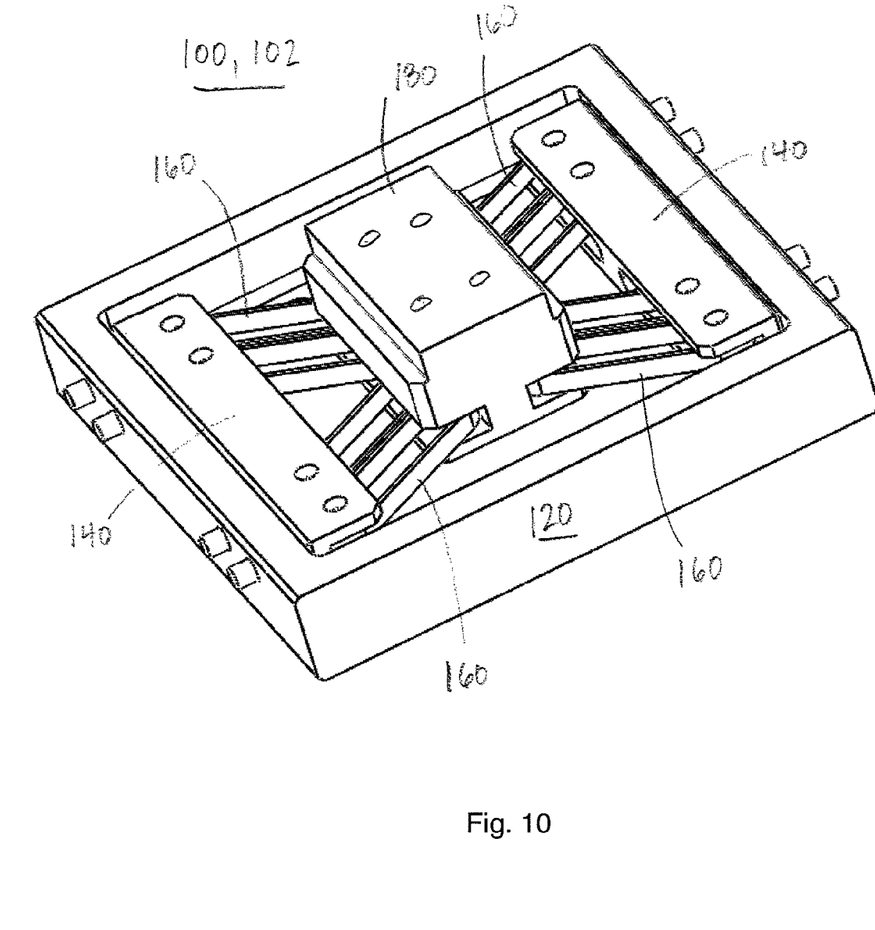
FIG. 10 is a perspective view of a center support module.

Referring to FIG. 10, the center and end support modules 102, 104 are substantially similar in structure, with the following three exceptions: The center support module 102 is substantially square when viewed in plan view, while the end support module 104 is rectangular; the center module 102 includes straps 160 arranged at an oblique angle to a side 122 thereof, while the end support module 104 includes straps 160 arranged in parallel to a side 122 thereof; and the center support module 102 employs eight straps 160 to support the support block 180, whereas the end support module 104 employs four straps 160 to support the support block 180.

In the end support module 104, the straps 160 are arranged to extend in parallel to the frame walls 122b, 122d. The end support modules 104 are received within the cutouts 88 such that the straps 160 are oriented perpendicular to an axial direction of the rotor assembly 60, and thus provide stability in a substantially circumferential direction as well as transferring torque to the rotor body 82. However, due to the relatively large size of the generator 10, in combination with the low temperatures employed within the cryostat 72, contraction of the rotor winding assembly 62 occurs relative to the rotor body 82, and the orientation of the straps 160 within the end support module 104 may become obliquely angled relative to the an axial direction of the rotor assembly when in use. In some embodiments, to accommodate the contraction, the end support modules 104 may include an offsetting pre-angle of the straps 160 prior to use, whereby when in use the straps 160 become oriented perpendicular to an axial direction of the rotor assembly 60.

In contrast to the strap configuration of the end support block 104, in the center support block 102, the straps 160 are oriented at an angle relative to both the axial direction of the rotor assembly and in the direction transverse the axial direction (the circumferential direction). By this configuration, the obliquely-angled straps 160 of the center support block 102 accommodate both axial and transverse torque forces, and thus provide axial stability.

Referring again to FIG. 9, when in use, the support module 100 (end support module 102 or center support module 104) is disposed in a corresponding cutout 88 of the rotor body 82, and the cutout 88 is provided with a depth such that the upper surfaces 123 of the frame walls 122a-d are substantially flush with the outer surface 85 of the rotor body 82. In this configuration, the support block 180 extends across the vacuum gap 76 and through an opening 69 formed in the winding support tube 68, and is connected to the mandrel 66, whereby the support block resides within the cold region of the generator 10. Because the straps 160 are formed of a thermally non-conductive material and are used to suspend the support block 160 within the frame 120, the support modules 100 substantially thermally decouple the rotor winding assembly 62, disposed in the cold space, from the rotor body 82, disposed outside the cold space.

The following method is used to assemble a rotor assembly 60 that incorporates the support modules 100 to support the rotor winding assembly 62 relative to the rotor body 82: Each support module 100 is pre-assembled separately from, and externally of, the rotor assembly 60 prior to being disposed within openings 88 of the rotor body 82, including applying a predetermined pre-tension load to the straps 160, and quality testing of the structure and strap tension load. Once this is completed, the support modules 100 are placed within the corresponding openings 88 of the rotor body 82 so that the frame 120 resides within the opening. In some embodiments, the support modules are secured to the rotor body using fasteners via the through holes 126 of frame bottom 124. The rotor body 82 is then placed within the support tube 68 of the rotor winding assembly 62, and the upper portion of each respective support block 180 is arranged to extend through the corresponding support tube opening 69. The support blocks 180 are then connected to the corresponding mandrel 66, for example by use of fasteners 190 via the bolt holes 188 of the support block 180.

A selected illustrative embodiment of the support module 100 for use in the generator 10 is described above in some detail. However, the rotor assembly as described herein is not limited to use in a generator. For example, the rotor assembly can be used in other types of rotating electrical machines, including motors.

In addition, it should be understood that only structures considered necessary for clarifying the present invention have been described herein. Other conventional structures, and those of ancillary and auxiliary components of the system, are assumed to be known and understood by those skilled in the art. Moreover, while a working example of the present invention has been described above, the present invention is not limited to the working example described above, but various design alterations may be carried out without departing from the present invention as set forth in the claims.

What is claimed is:

1. A support device for use in a rotor assembly of a rotating machine, the rotor assembly including a rotor winding and a rotor body,
   the support device comprising:
   a frame configured to be disposed on the rotor body;
   a support block configured to be connected to the rotor winding and suspended within the frame; and
   straps extending from each of a pair of opposed sides of the support block to the frame, the straps suspending the support block within the frame,
   the support device providing a connection between, and fixing relative positions of, the rotor winding and rotor body.

2. The support device of claim 1, the frame further including walls and a closed end, the support block suspended within the frame so as to be
   surrounded by the walls, and
   spaced apart from the walls and the closed end.

3. The support device of claim 2, wherein an inner surface of the frame walls are configured to connect to one of the straps.

4. The support device of claim 1, wherein the straps are provided with a predetermined tension load.

5. The support device of claim 1, wherein the straps comprise a substantially thermally non-conductive material.

6. The support device of claim 1, wherein the support block includes:
   a first surface configured to connect to a rotor winding;
   a second surface opposed to the first surface; and
   the opposed sides extending between the first and second surfaces, each of the opposed sides configured to connect to one of the straps.

7. The support device of claim 6, wherein the support block is suspended such that the second surface of the support block is spaced apart from the closed end of the frame.

8. The support device of claim 6, wherein the support block is suspended such that the first surface resides outside the frame.

9. The support device of claim 1, wherein at least one of the straps is configured to support loads applied both in an axial direction of the rotor assembly and in a direction transverse the axial direction.

10. The support device of claim 1, wherein the straps are oriented at an angle relative to both the axial direction of the rotor assembly and in the direction transverse the axial direction.

11. The support device of claim 1, wherein the frame includes walls that support tensioning pins, and the tensioning pins are configured to apply a tension load to the straps.

12. The support device of claim 11, wherein the tensioning pins permit adjustment of the amount of tension applied to the straps.

13. The support device of claim 1 wherein the support device substantially thermally decouples the rotor winding from the rotor body.

14. A rotor assembly of an electric rotating machine, the rotor assembly comprising:
  a rotor shaft coincident with a longitudinal axis of the rotor assembly;
  a cylindrical rotor body coaxial with and fixed to the rotor shaft;
  a winding assembly including a superconducting rotor winding wound around an axis transverse to the longitudinal axis, the rotor winding extending in a longitudinal direction and being radially spaced apart from the rotor body;
  and a support device disposed between the rotor winding and the rotor body, the support device comprising:
    a frame configured to be disposed on the rotor body;
    a support block configured to be connected to the rotor winding and suspended within the frame; and
    straps extending from each of a pair of opposed sides of the support block to the frame, the straps suspending the support block within the frame.

15. The support device of claim 14, the frame further including walls and a closed end, the support block suspended within the frame so as to be
  surrounded by the walls, and
  spaced apart from the walls and the closed end.

16. The support device of claim 14 wherein the support device substantially thermally decouples the rotor winding assembly from the rotor body.

17. The rotor assembly of claim 14 wherein the rotor body is ferromagnetic.

18. The rotor assembly of claim 14 wherein the winding assembly is disposed radially outward relative to the rotor body, and the support device resides in a space between the rotor body and the winding assembly.

19. The rotor assembly of claim 14 wherein the support device is a generally flat rectangular member such that the overall radial dimension of the support device is less than an overall dimension transverse to the overall radial dimension.

* * * * *